United States Patent Office 3,446,856
Patented May 27, 1969

3,446,856
METHYLATION OF PHENOLS
Stephen B. Hamilton, Jr., Schenectady, N.Y., assignor to General Electric Company, a corporation of New York
No Drawing. Filed May 29, 1964, Ser. No. 371,189
Int. Cl. C07c 39/12, 39/02
U.S. Cl. 260—620                    10 Claims This invention relates to a process for the methylation of the ortho position of phenols having at least one ortho-hydrogen. More particularly, this invention relates to a method for the vapor phase reaction of a phenol having hydrogen in at least one of the ortho positions with methanol in the presence of magnesium oxide as the catalyst at a catalyst bed temperature in the range of 475–600° C. The reaction proceeds readily at atmospheric pressure but may be carried out at subatmospheric or superatmospheric pressure.

The methylation of phenols having at least one ortho-hydrogen, i.e., at least one unsubstituted ortho position, for example, phenol, cresol, i.e., o-cresol, m-cresol, p-cresol, 2,4-xylenol, 2,3-xylenol, 3,5-xylenol etc., with methyl alcohol or methyl ether in the vapor phase using various metal oxides as catalysts is old in the art, e.g., Winkler, U.S. 2,448,942; Kunz, British 717,588, etc. Winkler et al. relates to a process which is particularly advantageous for the preparation of penta-substituted phenols. They employ either alcohols or ethers as the alkylating agent and metal oxides such as aluminum oxide, thorium oxide, zirconium oxide, zinc oxide, iron oxide, chromium oxide, manganese oxide, magnesium oxide, calcium oxide, barium oxide, etc., as the catalyst. Alumina is the preferred catalyst.

The reaction is carried out at superatmospheric pressure at temperatures in the range of 300° C. to about 450° C. Temperatures above about 430° C. decrease the yield of desired phenolic compounds. When phenol and methanol are reacted at temperatures above about 450° C. the production of hexamethyl benzene, a non-phenolic product is favored. For reactions of methanol with phenol, xylenol or cresol a temperature of 350–430° C. is desirable for high yields of higher alkylated phenols. Winkler et al. found that, when phenol is methylated with methanol, the ortho positions are the most easily methylated and the meta positions are the most difficult to methylate with the para position being intermediate between the ortho and meta positions with regard to ease of methylation. However, the ortho position is not methylated exclusively even when the methanol-to-phenol ratio is only sufficient to alkylate one position of each phenol nucleus. For example, when phenol is reacted with methanol in the ratio of 1 mole of methanol to one mole of phenol, the product recovered from the reaction contains unreacted phenol, o-cresol, 2,6-xylenol, and higher alkylated phenols plus some ethers and other unidentified material thus showing that although the ortho positions are most readily methylated, methylation of the other positions proceeds simultaneously.

Temperatures below about 350° C. increase the yield of ether by-products and temperatures higher than 450° C. cause carbonization and decomposition of the reactant and favor to a marked extent the production of hexamethylbenzene. Superatmospheric pressure of from 2 to 100 atmospheres, and preferably 10–20 atmospheres is essential to the process because it increases the yield of the alkylated phenolic products and has a marked inhibiting effect on the formation of alkylated hydrocarbon by-products, e.g., hexamethyl benzene.

Kunz relates to a process in which o-cresol is alkylated with methanol. Although a relatively low amount of the o-cresol is converted to higher alkylated products, a high proportion of the amount converted is 2,6-xylenol. The catalysts used are essentially those disclosed by Winkler et al., specifically the oxides of aluminum, thorium, zirconium, zinc, iron, maganese, magnesium, calcium, and barium. As in the Winkler et al. U.S. patent, alumina is the preferred catalyst. The reaction is carried out at a temperature range of 300°–450° C., preferably 350°–400° C., using up to 3 moles of methanol per mole of o-cresol, preferably 1½ moles of methanol to 1 mole of o-cresol at about 15–25 atmospheres gauge pressure. Under these conditions, 27 percent of the initial o-cresol is converted to higher alkylated products of which 66 percent or approximately 18 percent of the initial o-cresol reactant is converted to 2,6-xylenol.

Since both m- and p-cresol are found in the products of the Kunz process, it is apparent that some of the o-cresol rearranges to these isomeric cresols during the reaction. Further alkylation of such isomeric cresols with methanol produces meta- or para-substituted xylenols which apparently can also be produced by the reaction of methanol with the o-cresol. It would be very desirable to have a process in which this rearrangement to isomeric cresols and the production of xylenols other than 2,6-xylenol were greatly suppressed so that phenol or ortho-substituted phenols could be converted in very high yields to 2,6-disubstituted phenols. Also, it would be highly desirable that meta- and para-substituted phenols could be ortho-alkylated without danger of the substituents already in the meta- or para-positions migrating or disproportionating during the reaction or producing alkylated hydrocarbons.

One approach to prevention of higher alkylated phenols is disclosed by Smith et al. in U.S. 2,678,951, where an alcohol is reacted with a phenol in the presence of alumina catalyst in the ratio of 0.5 to 1 mole of alcohol per mole of phenol at a pressure of from 60–120 p.s.i.g. and at a temperature of from 425° to 550° C., using steam as a diluent in the amount of 2 to 6 moles of steam per mole of phenol. Under these conditions a higher yield of the ortho-substituted phenol is obtained but disproportionation still takes place as shown by the fact that when 3,5-xylenol is alkylated, although the yield of 2,3,5-trimethylphenol is increased, products having higher and lower boiling points are still obtained.

Unexpectedly, I have now found a very convenient process for producing high yields (high degree of conversion) of mono-o-methyl or di-o-methyl phenols with a very high degree of ortho-selectivity, i.e., a high proportion of the starting phenol is converted to products in which alkylation has occurred at only one or both of the ortho positions. My discovery is based on the fact that magnesium oxide is a unique catalyst for the reaction of methanol with phenols having at least one ortho hydrogen when used at catalyst bed temperatures of from 475° C. to 600° C. In this temperature range, ortho-alkylation of phenols having at least one unsubstituted ortho-position (i.e., there is hydrogen in at least one of the ortho positions) occurs almost exclusively even though the phenol may also have unsubstituted meta- and para-positions. Even phenol itself can be methylated in both ortho positions at high conversions with almost complete exclusion of any formation of meta- or para-substituted phenols, ethers, or alkylated hydrocarbons.

A contributing factor to the ortho-selectivity of my process is the fact that in the presence of magnesium oxide, isomerization reactions of cresols and xylenols do not occur. The only side reaction which produces p-substituted products that I have observed is that 2,6-xylenol disproportionates to a slight extent over magnesium oxide to form 2,4,6-mesitol and o-cresol. This side reaction can be minimized and even eliminated by decreasing the contact time of the 2,6-xylenol with the magnesium oxide. Other methylphenols also disproportionate but yield p-substituted products in low yields as by-products only when no ortho position is available. Thus, o-cresol disproportionates to form 2,6-xylenol and phenol.

Apparently, at these temperatures, magnesium oxide acts in an entirely different way as a catalyst than metal oxide catalysts generally do at lower temperatures and even in a different way than other metal oxides can react as catalysts at temperatures of from 475°–600° C. It appears that at temperatures of from 475°–600° C., the magnesium oxide surface dehydrogenates the methanol to formaldehyde which is absorbed on the magnesium oxide surface and immediately reacts with the phenol, also adsorbed on the magnesium oxide surface, forming a complex in which the magnesium oxide forms a bridge between the phenolic hydroxyl group and the ortho-hydroxymethyl group formed by the reaction of the phenol and formaldehyde. This complex decomposes to an o-methylenecyclohexadienone which immediately reacts with additional methanol to produce the orthomethylated phenol, formaldehyde and water. The formaldehyde generated by this reaction reacts with additional phenol to cause further alkylation. Because of the coordination of the reactants with the magnesium oxide surface, ortho-substitution occurs as the predominant reaction until all ortho-positions have been alkylated.

In further support for this mechanism, I have found that when the magnesium bridged complex of o-hydroxy-methylphenol (the intermediate postulated above) is heated with methanol at 450° C. in a sealed vessel, it produces 2,6-xylenol, o-cresol and 2,4,6-mesitol. Likewise, in the vapor phase over magnesium oxide at 450° C., salicylaldehyde and methanol produce a similar mixture of alkylated phenols. In each of these systems, phenol and methanol result in very little alkylation.

Further evidence for this mechanism is based on the fact that I have found that if I carry out my reaction in the temperature range of from 475°–525° C., I can increase the yield of 2,6-xylenol from phenol by adding from 1–20 mole percent formaldehyde to the methanol. Apparently, the dehydrogenation of methanol to formaldehyde in this lower temperature range does not occur as rapidly as it does at the higher temperatures. Once the reaction is started by the formaldehyde, either added with the methanol or formed by the reaction, the reaction proceeds as explained above to alkylate the phenol. At temperatures above 500° C. and especially 525° C., methanol itself is dehydrogenated to formaldehyde fast enough that there is no significant increase in yield of alkylated products if some of the methanol is replaced with formaldehyde. In the range of 525° to 600° C., yields of 2,6-xylenol are similar whether I start with methanol or methanol containing formaldehyde, but the use of formaldehyde with the methanol does produce more gaseous products due to an increased decomposition of the excess methylating agent. Catalyst bed temperatures greater than 600° C. are detrimental because of decomposition of the reactants and also the product, causing carbonization which destroys the catalytic activity of the magnesium oxide.

Further evidence for the above mechanism is based on the fact that dimethyl ether cannot be used as the alkylating agent in my process. Since dimethyl ether cannot form formaldehyde, its failure to act as an alkylating agent in my process indicates that the reaction mechanism is different from those processes, e.g., in the presence of aluminum oxide, where dimethyl ether can be used as the alkylating agent. Furthermore, it is known that the yield of anisole is increased as the temperature is decreased in the reaction of methanol and phenol in the presence of aluminum oxide, especially as the temperature is decreased below 350° C. It is also known that anisole will rearrange to cresols when passed over aluminum oxide at 320° C. However, anisole will not rearrange to cresols when passed over magnesium oxide under my reaction conditions. This indicates that anisole can be an intermediate in the reaction of methanol and phenol under prior art conditions, but not under my reaction conditions and that the processes are entirely different.

My reaction can be carried out in the conventional type of reactor used for vapor phase reactions over a solid catalyst. I generally use a tubular reactor, for example, a glass or metal tube which is filled with a static bed of magnesium oxide. The reactor is heated by any conventional means; for example, it is conveniently heated either by surrounding the reactor with an electrical heater, a heated gas, or a liquid such as a fused salt bath, liquid metal, etc., which can be conveniently maintained at reaction temperature by use of immersion-type electrical heaters. Because of the good heat transfer between a liquid and the reactor walls, a fused salt bath or other liquid medium generally gives the best temperature control of the reaction, although any means of heating may be used. Alternatively, a fluid bed reactor may be used. The reaction of methanol with the phenol is exothermic and therefore, it is desirable to control the catalyst bed temperature by using a control temperature on the heaters which is somewhat less than the desired bed temperature of the catalyst and allowing the heat of the exothermic reaction to keep the catalyst bed temperature at the slightly higher desired temperature.

The methanol and phenol can be mixed to form a solution which is then vaporized or separate streams of the two reactants may be fed to the same or separate vaporizers and then to the reactor. In order to minimize decomposition in the vaporization of the reactants, the vaporizer may be maintained at a minimum temperature necessary to vaporize the reactants and the vapor of the reactants preheated prior to entering the reactor by passing through a metal or glass tube which is heated by the same heating medium used to heat the reactor. In this way no cooling of the initial part of the reactor occurs due to the necessity of heating the reactants up to the reaction temperature.

Various phenols which I may methylate by my process are, by way of example, phenol itself, o-cresol, m-cresol, p-cresol, the various xylenols except 2,6-xylenol, for example, 2,3-xylenol, 2,4-xylenol, 2,5-xylenol, 3,5-xylenol, etc.; 2,3,4-trimethylphenol, 2,3,5-trimethylphenol, 3,4,5-trimethylphenol, 2,3,4,5-tetramethylphenol, etc.; o-phenylphenol, p-phenylphenol, 2-tolylphenol, 2,4-diphenylphenol, 2,3-diphenylphenol, 2-xylylphenol, 2-mesitylphenol, 2-durylphenol, etc.; 2-phenyl-4-methylphenol, 2-tolyl-4-phenylphenol, 2-phenyl-4-tolylphenol, 3-methyl-5-phenylphenol, etc. All of these phenols may be represented by the formula

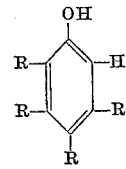

wherein each R is a monovalent substituent selected from the group consisting of hydrogen, methyl, phenyl, and methyl-substituted phenyl.

Any one or a mixture of the above phenols together with methanol is vaporized and passed through a reactor containing the magnesium oxide maintaining a temperature in the range of 475°–600° C. In order to obtain the maximum yield of ortho-methylated products, I desire to use at least one mole of methanol and preferably from 1 to 3 moles of methanol for each ortho position in the phenol to be methylated. For example, if phenol is to be methylated to produce a maximum yield of 2,6-dimethylphenol (2,6-xylenol), I prefer to use 2 to 6 moles of methanol for each mole of phenol with maximum yields being obtained with the higher ratio, i.e., 4 to 6 moles of methanol to 1 mole of phenol. Surprisingly enough, with these high ratios of methanol to phenol, an extremely small amount of 2,4,6-trimethylphenol and other higher methylated phenols are produced. In other words, my process is capable of selectively methylating the above phenols in the ortho position to the significant retardation of methylation in the other positions, even in the presence of excess methanol. Most of the excess methanol which is used is recovered unchanged in the reaction product mixture from which it may be recovered and reused as can also any unreacted phenol and any o-cresol which has been either added or formed in the reaction.

The vapors issuing from the reactor are condensed in the usual fashion and the products separated in the usual fashion, for example, by crystallization, distillation, etc. The reaction proceeds smoothly at atmospheric pressure which makes it convenient to carry out the reaction since it eliminates the need for pressure equipment and any hazards from the use of high pressure. Pressures above or below atmospheric pressure, however, can be used.

As will be apparent to those skilled in the art, my process can be carried out under a variety of reaction conditions. These conditions are temperature, pressure, flow rate of reactants, vapor space velocity of the reactants over the catalyst, contact time of the reactants with the catalyst, length of the catalyst bed, specific activity of the particular catalyst, etc. The effects of these reaction variables are those to be expected from a consideration of the technical aspects of the reaction involved. For example, the reaction of methanol with the phenol to produce the desired methylated products proceeds faster as the catalyst bed temperature is increased providing that the temperature is not so high that secondary reactions such as decomposition of the reactants or products occur to decrease the yield of desired product. Such secondary reactions do not occur to any appreciable extent in my reaction up to a temperature of 600° C. Above 600° C., decomposition of the reactants and product becomes a problem because it deposits carbon on the catalyst, decreasing its activity. In the range of from 275°–600° C., when using a high proportion of methanol to phenol, i.e., 2–3 times the amount of methanol required to methylate each ortho position of the phenol, the tendency to decompose methanol to gaseous products is increased, resulting in some loss of recovered methanol but without serious effect on the yield of desired methylated products. Below a temperature of 475° C., the reaction of methanol with the phenol is so slow that the yield of product per hour per volume of catalyst is so low as to make the reaction uneconomical to carry out, regardless of the reaction conditions.

To compensate for the lower rate of reaction in the range of 475–525° C., a longer contact time of the reactants with the catalyst should be used. This may be done by changing any one or several of the variables which decrease the vapor space velocity of the reactants over the catalyst, thus increasing the contact time. Examples of this are increasing the amount of catalyst, decreasing the flow rate of reactants, increasing the pressure in the reactor, etc. At the lower flow rates, there is some tendency for the selectivity to decrease because the longer contact time does permit any product which has been completely substituted in the two ortho positions in the initial part of the reaction to have time to react further to produce some para-substituted product. This loss in selectivity can be compensated by increasing the space velocity but not the flow rate of reactants by using an inert diluent for the reactants; for example, an inert gas, i.e., nitrogen, argon, etc., or an inert vapor, i.e., benzene, toluene, etc., or by using a lower pressure in the reactor.

If one desires to use pressure, one should increase the flow rate of the reactants to give an equal contact time. It of course will be recognized that it is possible to have a flow rate of reactants so great, either with or without pressure, that the catalyst is effectively "flooded" with reactant vapor so that it does not come in contact with the catalyst and react.

Generally, reaction conditions are chosen so as to minimize the amount of unreacted feed materials which must be recovered and reused. However, reaction conditions which on the face might appear undesirable from an overall yield point of view may be desirable from an economic point of view because of the very high degree of selectivity of the reaction under such conditions to give exclusively only ortho-methylated products. On the other hand, reaction conditions can also be adjusted to give high overall yields in terms of pounds of ortho-methylated product per hour per volume of catalyst when a very small yield of parasubstituted product can be tolerated.

It will also be recognized that, because of differences in the specific activities of magnesium oxide catalysts, each particular magnesium oxide catalyst will have different optimum reaction conditions than another magnesium oxide catalyst. The more reactive the catalyst, the shorter the contact time needs to be to give the same degree of conversion to ortho-methylated products. Therefore, a higher space velocity or a lower temperature may be used with a more reactive catalyst. I have found that a catalyst which has not been used in my reaction or has been regenerated has an induction period during which time the activity of the catalyst increases until it reaches a maximum activity which it maintains for a long period of time. Therefore, catalyst activity should not be measured until this steady state condition is obtained.

It is thus seen that my process provides a very flexible process for the ortho-methylation of phenols. Using magnesium oxide as the catalyst, methanol can be reacted with a phenol having hydrogen in at least one ortho position, as the essential ingredients, in the temperature range of 475–600° C. under a variety of pressure, space velocity and flow conditions with or without the use of diluents and with or without the use of formaldehyde to suit the individual desires of the operator to give a high conversion of the phenol to methylated products with a very high degree of selectivity for the methylation to occur at the ortho position.

Any magnesium oxide is suitable for use in my process Preferably, the magnesium oxide should be as free as possible of oxides of compounds which tend to be acidic in nature such as aluminum oxide, silicon, etc., but minor impurities of these materials can be tolerated. If such acidic materials are dense, e.g., fired to a temperature where they have fused or sintered, they become more or less inert and may be used as a support for the magnesium oxide without detrimental effect. Oxides of metals which are basic in nature as is magnesium oxide, e.g., zinc oxide, lead oxide, etc., and other known catalysts for the conversion of methanol to formaldehyde, e.g., zinc chromite, etc., when present in minor proportions, have a promoting action which increases the activity of the magnesium oxide, even though if these compounds were used alone they would not have the reactivity and selectivity as alkylation catalysts in my reaction as does magnesium oxide. This promoting action is more noticeable at the lower end of my temperature range, and is probably due to the fact that these promoters are more active than magnesium oxide at these temperatures in converting methanol to formaldehyde. These promoters can be used as a heterogeneous mixture throughout the catalyst bed, coprecipitated with the magnesium oxide, or as a separate zone at the inlet end of the reactor. If used, they are generally present in amounts up to 10% by weight of the total catalyst. In order to prevent vapors of reactants from sweeping particles of the catalyst from the reactor, it is desirable that the particle size of the magnesium oxide be at least large enough that it will remain in the reactor.

As would be expected, the reactivity of a given volume of catalyst is dependent on the surface area of the catalyst exposed to vapor of the reactants. For a given particle size, the most reactive catalyst is that in which the particles are extremely porous. Porous particles of magnesium oxide may readily be obtained by thermal decomposition of particles of a thermally decomposable magnesium compound which does not melt or sinter on heating. Magnesium carbonate, basic magnesium carbonate, and magnesium hydroxide make ideal compounds to be thermally decomposed to porous particles of magnesium oxide. The two magnesium carbonates give a more porous magnesium oxide than magnesium hydroxide, since they give off a greater volume of gas on being thermally decomposed. The more porous the catalyst, the greater volume a given weight of catalyst will occupy. If desired, the magnesium compound may be coated on an inert carrier and then thermally decomposed to give a porous magnesium oxide coating on the inert substrate. Magnesium oxide obtained by thermal decomposition will tend to sinter and become less porous if heated too hot. I prefer to carry out the thermal decomposition of the magnesium compound in the same temperature range as the magnesium oxide will be exposed to in my reaction, e.g., at the temperature range of 475°–600° C. In this way I obtain a magnesium oxide which is thermally stable under the reaction conditions. In order for the magnesium oxide to be most effective, the entire reactor should be filled with particles of the magnesium oxide and maintained at the reaction temperature.

Magnesium oxide retains its catalyst activity for several days under continuous operating conditions with little loss of its specific activity. Over long periods of operation, carbon deposition gradually decreases the specific activity. When this occurs, the catalyst is readily regenerated by oxidation of the carbon by means of oxygen or air at flow rates such that the catalyst bed temperature does not exceed the maximum of 600° C. Air diluted with an inert gas, e.g., nitrogen, argon, etc., can be used at higher flow rates than normal air.

In order that those skilled in the art may better understand my invention, the following examples are given by way of illustration and not by way of limitation. Salt bath temperatures are within ±3° C. of the stated temperature, and catalyst bed temperatures are reported to the nearest degree C. In all of the examples, percentages are by mole percents, unless otherwise stated.

EXAMPLE 1

This example compares the catalytic activity of magnesium oxide to that of aluminum oxide at a controlled temperature of 370° C. at both atmospheric and superatmospheric pressure. The aluminum oxide was commercially available aluminum oxide sold under the trade name "Porocel" prepared from naturally-occurring bauxite. The magnesium oxide catalyst was prepared from reagent grade basic magnesium carbonate powder having a minimum purity of 99.6 percent based on a composition of $4MgCO_3 \cdot Mg(OH)_2 \cdot 4H_2O$. This powder was placed in a rubber bag which was sealed and suspended in a liquid bath upon which an external pressure of 5,000 p.s.i. was applied. This treatment compressed the powder to a solid mass which was removed from the rubber bag and crushed and sieved to 4–20 mesh size particles.

The reactor consisted of a reservoir containing a solution of the methanol and the phenol, connected to a metering pump which fed the reactants through ¼-inch stainless steel tubing to a vaporizer made from a 12-inch long piece of 1¼ inch O.D., 1-inch I.D. stainless steel tubing. The vaporizer was surrounded by an electrical heater maintained at 350° C. The vapors from the vaporizer were fed through ¼-inch diameter stainless steel tubing to the bottom of a vertical 24-inch long piece of 1¼-inch O.D., 1-inch I.D. stainless steel tube reactor. The reactor was immersed in a fused salt bath to a depth of about 20 inches. Since the inlet tube for the reactants coming from the vaporizer also passed through the fused salt bath, it served as a preheater to preheat the vapor issuing from the vaporizer up to the temperature of the reactor. The reactor was equipped with a thermowell made from ¼-inch stainless steel tubing concentrically located for the entire length of the reactor so that the catalyst bed temperature could be measured throughout the entire length of the tube. The reactor tube was filled with a constant volume of 150 ml. of catalyst which filled the tube to a depth of about 18 inches. The product vapors from the actor were led to a water-cooled condenser and receiver.

Since the aluminum oxide was already in the form of its oxide, no pretreatment of the catalyst was necessary. In the case of the basic magnesium carbonate, it was converted to the oxide by loading the reactor tube and passing air through the reactor maintained at a temperature of 550° C. for a period of three hours during which time the carbonate loses 55–57 percent of its original weight, which is 95–100 percent of theoretical loss for the conversion of the basic carbonate to magnesium oxide. Analysis of one of the catalysts prepared by such method revealed a surface of 239 square meters per gram and a typical crystallite size of 50–100 A. The crystallite size increases during use of the catalyst in my process.

In this example, the salt bath temperature was controlled at 370° C. Phenol and methanol in the proportion of 3 moles of methanol to 1 mole of phenol were fed to the evaporator to give a total flow of either 24 or 240 ml. of liquid reactants per hour, corresponding to space velocity of 0.47 and 4.7 moles of reactants per 150 ml. of catalyst per hour. The pressure of the reactor was controlled at either atmospheric pressure or at 150 p.s.i.g. equal to approximately 11.2 atmospheres. A flow rate of 24 ml. per hour at atmospheric pressure gives approximately the same vapor space velocity of the reactant vapor through the reactor as a flow rate of 240 ml. per hour at 150 p.s.i.g. The results are shown in Table I.

TABLE I

| | Catalyst | | | | | |
|---|---|---|---|---|---|---|
| | $Al_2O_3$ | | | MgO | | |
| | Pressure, p.s.i.g. | | | | | |
| | 0 | 150 | 0 | 0 | 150 | 0 |
| Flow, ml. liquid reactants per hr... | 240 | 240 | 24 | 240 | 240 | 24 |
| Phenol | 2.7 | 3.7 | 31.5 | 95.9 | 80.6 | 44.5 |
| Anisole | 0.4 | 0.3 | 8.3 | | | |
| o-Cresol | 11.1 | 11.9 | 32.9 | 4.2 | 18.6 | 43.5 |
| Other Cresols | 2.7 | 3.1 | 1.9 | | | |
| 2,6-xylenol | 16.1 | 14.0 | 9.8 | | 0.4 | 11.5 |
| Other Xylenols | 17.3 | 16.7 | 6.1 | | 0.4 | 0.2 |
| 2,4,6-trimethylphenol | 9.6 | 11.4 | 1.2 | | | 0.3 |
| Other Trimethylphenols | 19.5 | 17.3 | 4.1 | | | |
| Tetramethylphenols | 12.7 | 12.5 | 1.6 | | | |
| Pentamethylphenol | 2.4 | 3.4 | 1.0 | | | |
| Pentamethylbenzene | 2.8 | 3.3 | 0.8 | | | |
| Hexamethylbenzene | 2.9 | 3.6 | 0.2 | | | |
| Other Hydrocarbons | | | | | | |
| Percent reactants recovered as liquid products | 92.8 | 94.2 | 80.8 | 99.0 | 96.5 | 95.0 |
| Maximum catalyst temp., °C | 417 | 421 | 378 | 366 | 366 | 366 |

From the results shown in Table I, it is seen that aluminum oxide is a much more reactive catalyst for the alkylation of phenol with methanol at a temperature of 370° C. and this is true regardless of the flow rate or pressure. Not only is the amount of phenol converted to alkylated phenols higher, but also the degree of alkylation is higher. The fact that aluminum oxide is a better catalyst at this temperature is shown also by the fact that a greater amount of heat is generated, as shown by maximum catalyst bed temperature in the reaction over aluminum oxide. At equal vapor space velocity, pressure definitely increases the yield of alkylated products over aluminum oxide. Surprisingly, this is not true with magnesium oxide.

EXAMPLE 2

Example 1 was repeated except that the salt bath temperature was 530° C. The results are shown in Table II.

TABLE II

| | Catalyst | | | | | |
|---|---|---|---|---|---|---|
| | $Al_2O_3$ | | | MgO | | |
| | Pressure, p.s.i.g. | | | | | |
| | 0 | 150 | 0 | 0 | 150 | 0 |
| Flow, ml. liquid reactants per hr | 240 | 240 | 24 | 240 | 240 | 24 |
| Phenol | 77.3 | 55.0 | 86.1 | 2.5 | 5.1 | 8.7 |
| Anisole | | | | >0.1 | 0.5 | 0.1 |
| o-Cresol | 4.3 | 7.1 | 7.1 | 42.5 | 29.5 | 34.2 |
| Other Cresols | 5.4 | 11.2 | 4.7 | | | |
| 2,6-xylenol | 0.1 | 0.1 | 0.1 | 54.8 | 59.0 | 51.2 |
| Other Xylenols | 0.8 | 2.6 | 0.6 | | | |
| 2,4,6,-trimethylphenol | | | | 0.2 | 5.9 | 5.9 |
| Other Trimethylphenols | | 0.9 | | | | |
| Tetramethylphenols | | 0.5 | | | | |
| Pentamethylphenol | | 0.3 | | | | |
| Pentamethylbenzene | | 0.6 | | | | |
| Hexamethylbenzene | | 0.1 | | | | |
| Other Hydrocarbons | 11.5 | 21.7 | 1.9 | | | |
| Percent reactants recovered as liquid products | 81.2 | 78.1 | 77.8 | 93.1 | 89.9 | 90.0 |
| Maximum Catalyst Temp., °C | 535 | 537 | 535 | 530 | 536 | 532 |

The results shown in Table II show the very surprising result that magnesium oxide is a much more active catalyst than aluminum oxide at the higher temperature. Almost all of the alkylation in the presence of magnesium oxide has occurred only in the two ortho positions. The higher temperature of Example 2 has caused the aluminum oxide to produce a very high proportion of hydrocarbon and gaseous by-products which are undesirable. Surprisingly also, pressure has very little effect on the reaction carried out in the presence of magnesium oxide. Also, although flow rate and space velocity has some effect on the reaction in the presence of magnesium oxide, flow rate and space velocity are not critical in carrying out my reaction as regards ortho alkylation of the phenol. Therefore, my reaction can be carried out at a wide selection of flow rates, space velocities, and pressures to suit the desires of the operator.

When the above reaction with magnesium oxide was repeated at salt bath temperatures of 555°, 575° and 600° C., a ratio of 2.7 moles of methanol to 1 mole of phenol and a feed rate of 225 ml. of liquid reactants per hour, corresponding to a space velocity of 4.2 moles of reactants per 150 ml. of catalyst per hour, it was noted that the maximum catalyst bed temperatures were 585°, 600° and 615° C., respectively. It was noted that as the temperature increased the amount of non-condensable gases greatly increased. Analysis of the product showed that the amount of unreacted phenol increased from 11.1% to 19.4% to 53.2% as the maximum catalyst bed temperature increased from 585° to 600° to 615° C., respectively. The corresponding yields of 2,6-xylenol decreased from 48.1 to 32.0 to 9.5% at these temperatures. This indicates that the methanol is being decomposed and removed as a reactant to the detriment of the reaction as the temperature exceeds 600° C. It was also noted that as the reaction was continued above 600° C., the reactivity of the catalyst was decreasing with time, indicating that carbon was being deposited on the catalyst.

EXAMPLE 3

Phenol and methanol in the proportion of 5 moles of methanol to 1 mole of phenol were reacted in the reactor described in Example 1, using magnesium oxide as the catalyst. The salt bath temperatures were 480, 510 and 540° C. The reactants were fed at the rate of 95 and 345 ml. liquid reactants per hour corresponding to space velocities of 2.04 and 7.2 moles of reactants per 150 ml. of catalyst per hour. The results are shown in Table III.

TABLE III

| | Temp., °C. | | | | | |
|---|---|---|---|---|---|---|
| | 480 | | 510 | | 540 | |
| Flow ml. liquid reactants per hr | 95 | 345 | 95 | 345 | 95 | 345 |
| Phenol | 5.7 | 59.7 | 0.6 | 7.8 | 0.9 | 0.3 |
| o-Cresol | 28.8 | 36.2 | 0.4 | 57.6 | 4.3 | 1.7 |
| 2,6-xylenol | 63.3 | 4.1 | 92.5 | 34.4 | 83.2 | 95.4 |
| 2,4,6-trimethylphenol | 2.2 | | 6.4 | 0.2 | 11.6 | 2.6 |
| Maximum catalyst temp., °C | 493 | 495 | 529 | 530 | 539 | 550 |

Even with the large excess of methanol, alkylation has occurred almost predominantly in the two ortho positions. As would be expected, an increase in temperature causes a greater reactivity and therefore, at the higher flow rate, a higher yield is obtained as the temperature is increased. At lower temperatures, a higher yield is obtained by using a lower flow rate, since it gives a longer period for the reaction to occur. Lower flow rates than illustrated can be used, but the yield per hour for a given size reactor decreases as the flow rate decreases. Furthermore, the amount of trimethylated phenol, although minor, increases as the flow rate is decreased. If ortho cresol is the desired product, then one would use a lower temperature than if 2,6-xylenol is the desired product. It is seen that my process has great flexibility. If one desires to operate in the lower temperature range of my invention, a lower flow rate can be used which will give high yields of ortho alkylated product, whereas if a high production rate of 2,6-xylenol is desired, it is best to operate at higher temperatures within the range of my invention.

EXAMPLE 4

This example illustrates the use of an inert diluent to change the vapor space velocity of the reactant vapors while keeping the flow and space velocity of the reactants constant. Phenol and methanol in the proportion of 5 moles of methanol to 1 mole of phenol were reacted in the reactor described in Example 1 using magnesium oxide catalyst. The salt bath temperature was controlled at 535° C. The reactants were fed at a rate of 104 ml. of liquid reactants per hour, corresponding to a space velocity of 2.22 moles of reactants per 150 ml. of catalyst per hour. Under these conditions, the maximum catalyst bed temperature was 539° C. and the product analyzed 4.0% o-cresol, 86.0% 2,6-xylenol and 10.0% 2,4,6-trimethylphenol. Nitrogen was then introduced at the rate of 4.0 cubic feet (S.T.P.) per hour keeping everything else constant. Under these conditions, the maximum catalyst bed temperature was 538° C. and the product analyzed 0.3% o-cresol, 95.9% 2,6-xylenol and 3.8% 2,4,6-trimethylphenol. The flow of nitrogen was then stopped to give the initial conditions. The maximum catalyst bed temperature was 535° C. and the product analyzed 1.7% o-cresol, 88.0% 2,6-xylenol, and 10.3% 2,4,6-trimethylphenol, thus showing that the effect of the diluent was real and definitely decreased the yield of the trimethylphenol while increasing the yield of 2,6-xylenol. This same effect was obtained by the use of other inert gases, e.g., argon, krypton, etc., or vapors of an inert hydrocarbon, e.g., benzene, toluene, etc.

EXAMPLE 5

This example illustrates how methanol containing formaldehyde can be used to increase the alkylation of phenol at lower temperatures. Phenol and methanol in the proportion of 2.7 moles of methanol or 2.7 moles of combined methanol and formaldehyde per mole of phenol were passed over magnesium oxide prepared as described above in Example 1 at a flow rate of 210 ml. of liquid reactants per hour, corresponding to a space velocity of 3.89 moles of reactants per 120 ml. of catalyst per hour, but using a horizontal glass reactor containing 120 ml. of catalyst heated with electrical heaters. Separate reservoirs, metering pumps and vaporizers for the phenol and methanol-formaldehyde mixture were used to prevent any reaction of the phenol and formaldehyde in these parts of the system. At a temperature of 475° C., when methanol containing no formaldehyde was used, only 3 percent of the phenol was alkylated, whereas when methanol containing 5 mole percent trioxane (calculated as monomeric formaldehyde) was used, 30 percent of the phenol was alkylated. At 500° C., the corresponding figures were 13 and 39 percent and at 555° C., the corresponding figures were 70 and 74 percent, showing that at 550° C., the addition of formaldehyde to the methanol has very little effect but has a beneficial effect which increases as the temperature is decreased. In a series of experiments I have determined that at temperatures in the lower part of my temperature range, an increase in the amount of formaldehyde from 1 to 5 mole percent in the methanol feed doubles the amount of alkylation. Increasing the formaldehyde content from 5 to 20 mole percent increases the amount of alkylation by a factor of 1½. Thus, for practical purposes, to obtain increased yields of orthomethylated phenols, concentrations of formaldehyde should be in the range of 1 to 20 mole percent based on the methanol feed, in the temperature range of from 475 to 525° C.

Since other basic metal oxides are more active than magnesium oxides in the lower temperature region of my process in dehydrogenating methanol to formaldehyde, the above effect of adding formaldehyde to the methanol feed can also be obtained by using a magnesium oxide containing a basic metal oxide which is very active in dehydrogenating methanol to formaldehyde. I have studied the effect of additions of various anions and cations to the magnesium oxide with the results shown in the following Table IV. Sulfate, nitrate and chloride were added by treating magnesium oxide with aqueous solutions of the corresponding magnesium salts. Molybdate and phosphate were added by treating magnesium oxide with molybdic and phosphoric acid, respectively. Methoxyl and methoxyl carbonate were added by treating magnesium oxide with methanol solutions of magnesium methoxide and magnesium methyl carbonate, respectively. Silica was added by precipitating magnesium hydroxide from magnesium nitrate in the presence of silica. All of the metal cations, including aluminum and beryllium, were added by treating magnesium oxide with aqueous solutions of the metals in the form of their nitrate salts which were decomposed to oxides at the temperature of the reaction prior to the introduction of the reactants.

TABLE IV.—MODIFIED MAGNESIUM OXIDE CATALYSTS

| | Weight Percentages of Additive | Effect | | |
|---|---|---|---|---|
| | | Conversion | | Selectivity |
| | | 500° C. | 550° C. | |
| Anions: | | | | |
| $SO_4^=$ | 1, 2 | + | 0 | — |
| | 7, 20, 100 | ++ | 0 | — |
| $PO_4^{4-}$ | 3, 7 | + | 0 | — |
| $NO_3^-$ | 1 | 0 | 0 | 0 |
| $Cl^-$ | 1 | — — | — — | 0 |
| $MoO_3^=$ | 1 | + | — | — |
| $BO_3^=$ | 1, 5 | ++ | N.D. | — |
| $OCH_3^-$ | ca. 5 | 0 | 0 | 0 |
| $OCH_3^-, CO_3^=$ | ca. 5 | 0 | 0 | 0 |
| Acidic Oxides: | | | | |
| $Al_2O_3$ | 5 | + | — | — — |
| $SiO_2$ | 1, 10, 50 | ++ | — | — — |
| $BeO_2$ | 5 | + | — | — |
| Cations: | | | | |
| $Zn^{++}$ | 1 | ++ | + | 0 |
| $Pb^{++}$ | 1, 5 | + | + | 0 |
| $Fe^{++}$ | 1 | + | 0 | 0 |
| $Hg^{++}$ | 1 | 0 | 0 | 0 |
| $Co^{++}$ | 1 | 0 | 0 | 0 |
| $Y^{+++}$ | 1 | — | — | 0 |
| $Ag^+$ | 1 | 0 | 0 | 0 |
| $Cr^{+++}$ | 1, 5 | + | — | 0 |
| $Na^+$ | 5 | 0 | 0 | 0 |
| $Cu^{++}$ | 1 | — | — | 0 |
| $Ni^{++}$ | 1, 5 | 0 | 0 | 0 |

[1] The effect on selectivity was independent of the temperature.
Key:
++ = Large increase.
+ = Increase.
0 = No effect observed.
— — = Large decrease.
— = Decrease.
N.D. = Not determined.

EXAMPLE 6

Using the reactor as described in Example 1, 5 moles of methanol were reacted with 1 mole of o-cresol at a salt bath temperature of 530° C. using a flow rate of 250 ml. of liquid reactants per hour, corresponding to a space velocity of 6.3 moles of reactants per 150 ml. of catalyst per hour. The maximum temperature reached in the catalyst bed was 547° C. The product analyzed 0.3 percent unchanged o-cresol, 96.5 percent 2,6-xylenol, and 3.0 percent 2,4,6-trimethylphenol.

When m-cresol was used in place of the o-cresol at the same reaction conditions but using a flow rate of 200 ml. of liquid reactants per hour, corresponding to a space velocity of 5.2 moles of reactants per 150 ml. of catalyst per hour, the maximum bed temperature of the catalyst was 550° C. The product analyzed 0.1 percent unchanged m-cresol, 2.0 percent 2,3-dimethylphenol, 2.4 percent 2,5-dimethylphenol, and 95.1 percent of 2,3,6-trimethylphenol.

When p-cresol was substituted for the o-cresol under the same reaction conditions using a flow rate of 200 ml. of liquid reactants per hour, corresponding to a space velocity of 5.2 moles of reactants per 150 ml. of catalyst per hour, the maximum bed temperature was 545° C. The product analyzed 9.3 percent 2,4-dimethylphenol, and 90.7 percent 2,4,6-trimethylphenol.

When 3,5-xylenol was used in place of the o-cresol under the same reaction conditions at a flow rate of 200 ml. of liquid reactants per hour, corresponding to a space velocity of 5.2 moles of reactants per 150 ml. of catalyst per hour, the maximum bed temperature was 550° C. The product analyzed 1.8 percent 2,3,5-trimethylphenol, and 98.3 percent 2,3,5,6-tetramethylphenol.

When 2-phenylphenol was substituted for the o-cresol using a ratio of 3 moles of methanol to 1 mole of phenol at a flow rate of 235 ml. of liquid reactants per hour, corresponding to a space velocity of 4 moles of retactants per 150 ml. of catalyst per hour at a salt bath temperature of 550° C., the maximum temperature rose to 575° C. Analysis of the product showed 6.1 percent unchanged 2-phenylphenol, 87 percent 2-methyl-6-phenylphenol, and 6.9 percent 2,4-dimethyl-6-phenylphenol.

EXAMPLE 7

In addition to using magnesium oxide prepared as described above from basic magnesium carbonate, I have used commercially available magnesium oxide and magnesium oxide prepared by decomposition of magnesium hydroxide which has been compressed and thermally decomposed as described above in Example 1, and I have used a naturally-occurring magnesium carbonate (magnesite) which was thermally decomposed to magnesium oxide without any compaction. Also, I have used, with good results, magnesium oxide supported on inert carriers, e.g., calcium silicate, fused alumina, etc., by coating the carriers with magnesium methyl carbonate, magnesium acetate and magnesium methoxide which were then thermally decomposed to magnesium oxide. The activities of such supported catalysts are dependent on the quantity of magnesium oxide present.

The ortho-methylated products of my invention have the same utility as the identical phenols produced by other synthetic processes or recovered from naturally occurring coal tar products. They may be used for example, in making polyphenylene ethers, bisphenols or used as stabilizers for gasoline or other fuels for internal combustion engines.

Although the above examples have shown various modifications and variations of the present invention, other modifications and variations are possible in light of the above teachings. It is therefore to be understood that changes may be made in the particular embodiments of the invention described which are within the full intended scope of the invention as defined by the appended claims.

What I claim as new and desire to secure by Letters Patent of the United States is:

1. The process of selectively methylating a phenol in the ortho position to the significant retardation of methylation in the meta and para positions, which comprises reacting, as the essential ingredients, methanol with a phenol having the general formula

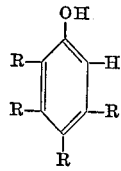

where each R is a monovalent substituent selected from the group consisting of hydrogen, methyl, phenyl, and methyl-substituted phenyl, in the vapor phase in the presence of magnesium oxide as the catalyst, said reaction being carried out at a catalyst bed temperature in the range of 475–600° C.

2. The process of claim 1 wherein the methanol contains from 1–20 mole percent formaldehyde and the reaction is carried out in the temperature range of from 475–525° C.

3. The process of claim 1 wherein the methanol is substantially free of formaldehyde and the reaction is carried out in the temperature range of 500–600° C.

4. The process of claim 1 wherein the catalyst is magnesium oxide containing up to 10 weight percent, based on the total weight of the catalyst, of a metal oxide selected from the group consisting of zinc oxide and lead oxide.

5. The process of claim 1 wherein the ratio of methanol to said phenol is greater than one mole of methanol per mole of said phenol.

6. The process of selectively methylating a phenol in the ortho position to the significant retardation of methylation in the meta and para positions, which comprises reacting, as the essential ingredients, methanol with a phenol selected from the group consisting of phenol, o-cresol, m-cresol, p-cresol, o-phenylphenol, and 3,5-xylenol, in the vapor phase in the presence of magnesium oxide as the catalyst, said reaction being carried out at a catalyst bed temperature in the range of 475–600° C. and the ratio of methanol to said phenol is greater than one mole of methanol per mole of said phenol.

7. The process of selectively producing 2,6-xylenol to the significant retardation of the formation of 2,4-xylenol, 2,4,6-trimethylphenol and higher methylated phenols, which comprises reacting, as the essential ingredients, methanol with phenol in the vapor phase in the presence of magnesium oxide as the catalyst, said reaction being carried out at a catalyst bed temperature in the range of 475–600° C. and the ratio of methanol to phenol is greater than two moles of methanol per mole of phenol.

8. The process of selectively producing 2,6-xylenol to the significant retardation of the formation of 2,4-xylenol, 2,4,6-trimethylphenol and other higher methylated phenols, which comprises reacting, as the essential ingredients, methanol with o-cresol in the vapor phase in the presence of magnesium oxide as the catalyst, said reaction being carried out at a catalyst bed temperature in the range of 475–600° C. and the ratio of methanol to o-cresol is greater than one mole of methanol per mole of o-cresol.

9. The process of selectively producing 2-methyl-6-phenylphenol to the significant retardation of the formation of 2,4-dimethyl-6-phenylphenol and other higher methylated phenols, which comprises reacting, as the essential ingredients, methanol with 2-phenylphenol in the vapor phase in the presence of magnesium oxide as the catalyst, said reaction being carried out at a catalyst bed temperature in the range of 475–600° C. and the ratio of methanol to 2-phenylphenol is greater than one mole of methanol per mole of 2-phenylphenol.

10. The process of selectively producing 2,6-xylenol to the significant retardation of the formation of 2,4-xylenol, 2,4,6-trimethylphenol and other higher methylated phenols, which comprises reacting, as the essential ingredients, methanol with a mixture of phenol and o-cresol in the vapor phase in the presence of magnesium oxide as the catalyst, said reaction being carried out at a catalyst bed temperature in the range of 475–600° C. and a ratio of methanol to phenol and to o-cresol in the mixture is greater than two moles of methanol per mole of phenol and greater than one mole of methanol per mole of o-cresol.

References Cited

UNITED STATES PATENTS

| | | | |
|---|---|---|---|
| 2,401,608 | 6/1946 | Burawoy | 260—621 |
| 2,448,942 | 9/1948 | Winkler et al. | 260—621 |
| 2,678,951 | 5/1954 | Smith et al. | 260—621 |

LEON ZITVER, *Primary Examiner.*

N. MORGENSTERN, *Assistant Examiner.*

U.S. Cl. X.R.

260—619, 621